(12) United States Patent
Schnoerer et al.

(10) Patent No.: US 8,606,668 B2
(45) Date of Patent: Dec. 10, 2013

(54) PARALLEL AVAILABILITY CONTROL CHECKS IN FINANCIAL MANAGEMENT SYSTEM

(75) Inventors: Horst Schnoerer, Angelbachtal (DE); Christian Metz, Paris (FR); Andreas Schaefer, Mougins (FR); Juergen Hollberg, Wiesloch (DE)

(73) Assignee: SAP AG, Walldorf (DE)

( * ) Notice: Subject to any disclaimer, the term of this patent is extended or adjusted under 35 U.S.C. 154(b) by 2599 days.

(21) Appl. No.: 10/739,131

(22) Filed: Dec. 19, 2003

(65) Prior Publication Data

US 2005/0021431 A1    Jan. 27, 2005

Related U.S. Application Data

(60) Provisional application No. 60/488,815, filed on Jul. 22, 2003.

(51) Int. Cl.
*G06Q 40/00* (2012.01)
*G06F 17/30* (2006.01)

(52) U.S. Cl.
USPC ............................................. 705/35; 707/9

(58) Field of Classification Search
USPC ......................................................... 705/35
See application file for complete search history.

(56) References Cited

U.S. PATENT DOCUMENTS 7,107,268 B1 *  9/2006  Zawadzki et al. ..................... 1/1
2002/0174030 A1 * 11/2002  Praisner et al. .................. 705/26

OTHER PUBLICATIONS

Hallberg, Bruce A., Sherry Kinkoph, and Bill Ray. Using Microsoft Excel 97. Special Edition. Indiana: Que, 1997: 204, 216, 460-465,467-469.*
Using Microsoft Excel 97, by Hallberg, Bruce A., Sherry Kinkoph, and Bill Ray (hereinafter UME).*

* cited by examiner

*Primary Examiner* — Garcia Ade
(74) *Attorney, Agent, or Firm* — Kenyon & Kenyon LLP

(57) ABSTRACT

A rule set for an AVC system permits AVC operations to be performed at various levels of hierarchy within a governing budget data structure. A rule set contains a plurality of rules, each having an address field which relates an arbitrarily assigned control object to budget nodes in a budget data structure. Control objects typically are assigned to various units and aggregation levels within an organization and also across other dimensions. Rule arrays with several independent rule sets can be activated in parallel for checking an individual input data record against multiple budgetary requirements defined for the organization. This structure provides a comprehensive AVC control feature even for very large budget data structures and complex budgetary control environments.

5 Claims, 4 Drawing Sheets

200

300

| CONTROL OBJECT | BUDGET ADDRESS 310 | TEST 320 | RESPONSE 330 | |
|---|---|---|---|---|
| A | [A, A1, A2, A1.1, A1.2, A2.1, A2.2, A2.3, A2.4] | EXP≤BGT | Error | RULE SET 1 340 |
| B | [B] | EXP≤BGT | Error | |
| C | [C, C1, C2, C3, C4, C5, C2.1, C2.2, C2.3, C5.1, C5.2, C5.3, C5.4, C5.5] | EXP≤BGT | Error | |
| A1 | [A1, A1.1, A1.2] | EXP≤1.1BGT | Error | RULE SET 2 350 |
| A2 | [A2, A2.1, A2.2, A2.3, A2.4] | EXP≤BGT | Warning | |
| ... | ... | ... | ... | |
| C5 | [C5, C5.1, C5.2, C5.3, C5.4, C5.5] | EXP≤BGT | Warning | |

360
370
380

1000

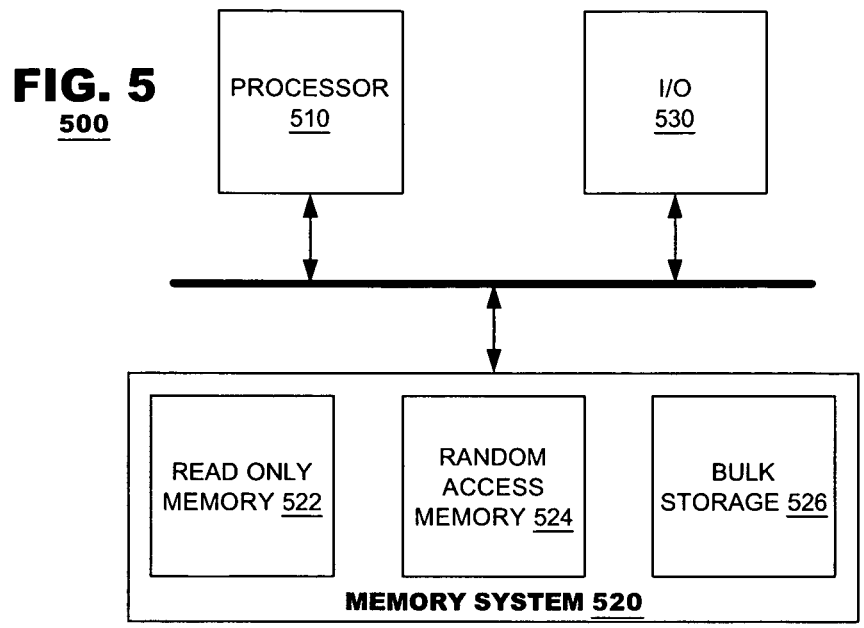

PARALLEL AVAILABILITY CONTROL CHECKS IN FINANCIAL MANAGEMENT SYSTEM

This application benefits from the priority of provisional application Ser. No. 60/488,815, filed Jul. 22, 2003, the disclosure of which is incorporated herein.

BACKGROUND

Availability Control ("AVC") refers to an oversight feature in budget control software that monitors ongoing expenditures of a business unit (an organization, department, subunit) and determines whether they are consistent with a budgetary plan established for that business unit. If an operator attempts to enter a transaction having an expenditure that is inconsistent with the budgetary plan, an AVC system may either block the transaction or generate online an alert within the system (perhaps an e-mail notification to a predetermined addressee) in response.

Currently available AVC systems are quite limited. SAP AG, the assignee of the present invention, currently employs an AVC oversight feature that can perform at most one defined AVC inquiry directed to a single hierarchical level within an organization. However, the inventors perceive a need in the art to expand such oversight to include implementation of multiple parallel AVC rules.

BRIEF DESCRIPTION OF THE DRAWINGS

FIG. 5 is a simplified block diagram of a computer system having application with various embodiments of the present invention.

DETAILED DESCRIPTION

Embodiments of the present invention provide a rule array for an online AVC system that permits an entirely flexible definition of multiple AVC checks. The rule array contains one or several independent rule sets. Each rule set may include a plurality of control objects that address nodes of a budget data structure. Control objects typically are assigned to various units within an organization and also across other dimensions. The rule sets can address arbitrarily assigned control objects. Thus, it becomes possible to activate different rule sets in parallel to check an individual input data record against multiple budgetary requirements defined for the organization.

Figure 1:
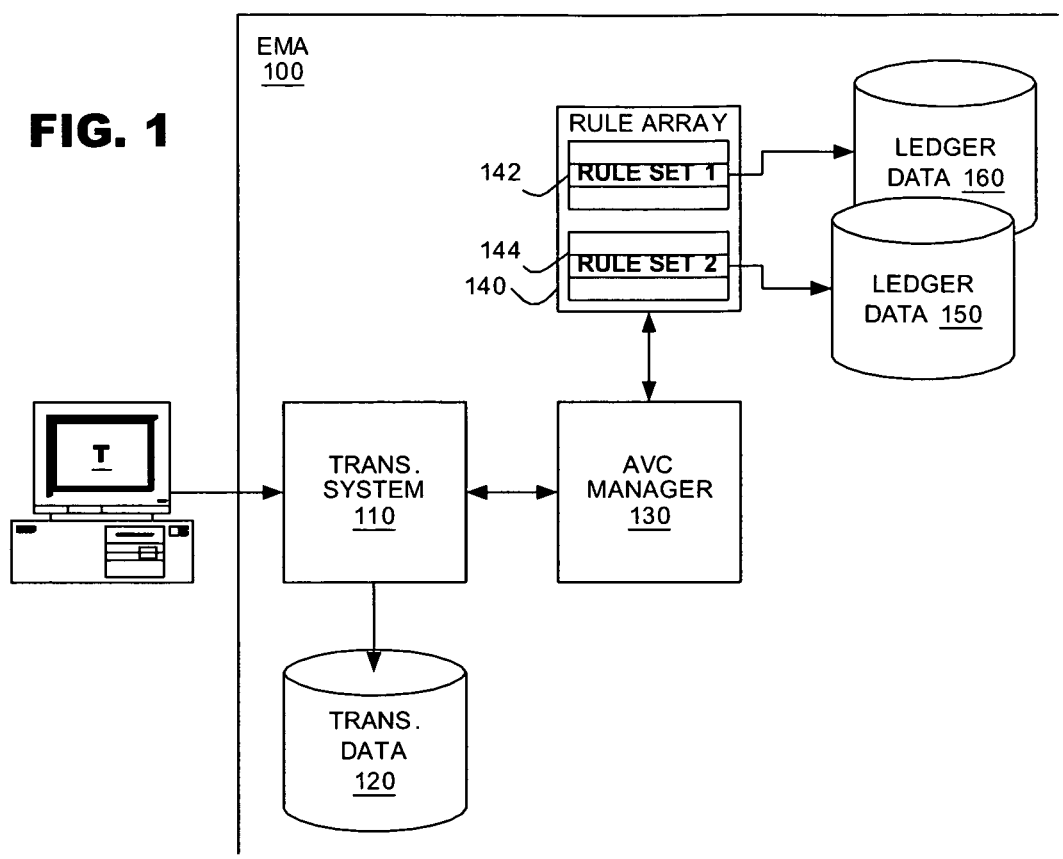
FIG. 1 is a functional block diagram of a financial management application according to an embodiment of the present invention.

FIG. 1 is a functional block diagram of an enterprise management application ("EMA") 100 provided with AVC functionality according to embodiments of the present invention. There, the EMA system is illustrated as including a transaction system 110, a transaction database 120, an AVC manager 130, a rule array 140 and ledger database 150, 160. The transaction system 110 and transaction database 120 engage with a client terminal T to process transactions entered at the terminal T during the ordinary course of an organization's business. Modern EMAs 100 may include financial management modules, materials management modules, financial instruments modules and the like and provide databases to record activity with respect to each. For the purposes of this discussion, these modules are represented in the abstract by transaction system 110 and transaction database 120. In this regard, the operation of EMAs is well known.

Embodiments of the present invention introduce a parallel AVC mechanism to an EMA 100. In FIG. 1, the AVC feature may include an AVC manager 130, a rule array 140 and one or more ledger databases 150, 160. The rule array 140, as its name implies, stores one or more rule sets. The rule sets define budgetary requirements that new transactions posted at terminal T must simultaneously comply with. Two rule sets 142, 144 are illustrated in FIG. 1; there may be more or fewer as desired when the AVC feature is implemented. For each rule set, the EMA system 100 may provide a corresponding ledger database 150, 160. Ledger databases may store aggregations of budget values and aggregations of expenditures already admitted to the system. Often, the budget values and expenditure aggregations are organized into budget nodes according to predetermined budget data structures of the organization for which the EMA 100 is deployed.

The AVC manager 130 manages execution of rules in response to new expenditure transaction requests that are made of the EMA system 100. When a new expenditure transaction request is received by the EMA system 100, the AVC manager 130 may determine whether the transaction request is related to any rule in the rule array 140. If so, it executes the rule to determine if the new transaction request complies with it. Transactions that comply with all relevant rules may be admitted to the system and may update the assigned ledger database 150, 160.

Figures 2, 3:
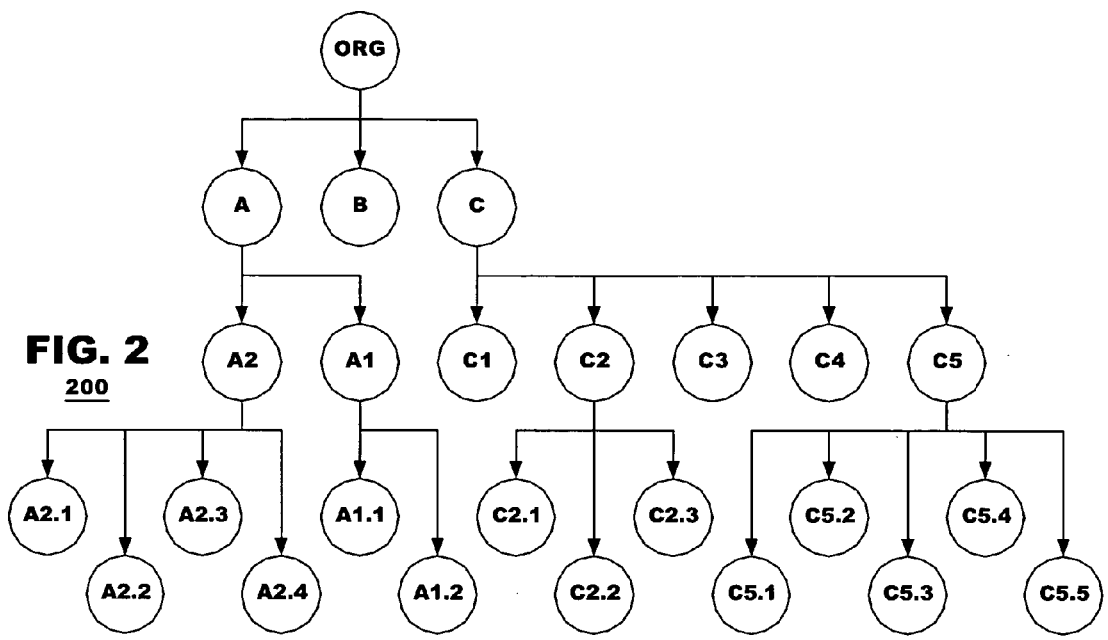
FIG. 2 illustrates an exemplary budget data structure.
FIG. 3 illustrates a rule array containing two rule sets according to an embodiment of the present invention.

Operation of the AVC management features might best be understood with reference to an example involving a hypothetical organization. Consider an organization composed of departments A, B and C. Department A may include sub-departments A1 and A2, department B may have no sub-departments and department C may have sub-departments C1, C2, C3, C4 and C5. FIG. 2 illustrates an exemplary budget data structure that might be used to record expenditure transactions associated with the organization. Expenditure transactions may be recorded in a database identifying not only the department or sub-department to which the transaction relates but other dimensions as well including, for example, the type of expenditure (e.g., salary, supplies, equipment), or a project to which the expenditure relates.

The budget data structure 200 of FIG. 2 may include various budget nodes to represent divisions within the organization as well different dimensions of expenditures that may be charged to such divisions. Thus, the budget data structure includes budget nodes for department A, sub-departments A1 and A2 and expenditure types A1.1, A1.2, A2.1, A2.2, A2.3 and A2.4. Some expenditure types may be common to many different sub-departments (e.g., salary or equipment) but others may be unique to individual sub-departments. The architecture of the budget data structure depends on the business requirements of the organization it represents rather than any requirements imposed by the EMA system.

Within each node of the budget data structure, the system may store values representing allocated budget for the corresponding business unit/dimension and also aggregations of expenditure transactions charged against it. In practice, it is permissible to define two databases, one for budget and the other for expenditure data, if so desired. Such implementation preferences are immaterial for the purposes of the present invention. All that is required is that the AVC manager can access budgetary values and expenditure aggregation values provided within each of the budget nodes.

FIG. 3 illustrates exemplary rule sets 300 according to an embodiment of the present invention. Rules are represented by control objects, which include budget addresses 310 identifying nodes from within the budget data structure that are subject to the rule, test fields 320 identifying a relationship that must be satisfied by the total budget and total expenditure values within the control objects to satisfy the rule, and a response field 330 identifying an action to be taken when the rule is not satisfied. A first rule set 340 is shown providing rules for control objects A, B and C and a second rule set 350 is shown providing rules for control objects A1, A2 and C among others.

Figure 4:
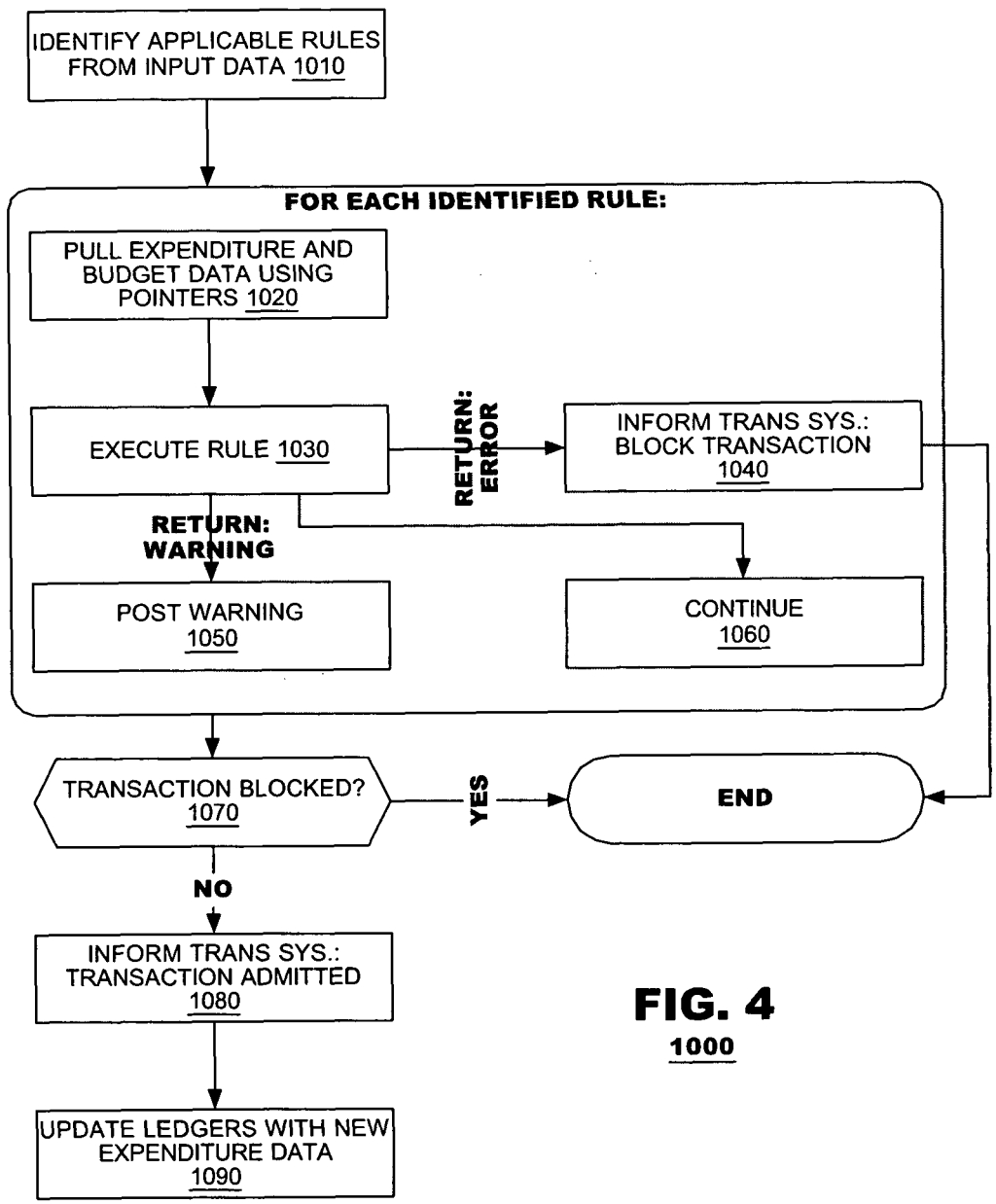
FIG. 4 illustrates a method according to an embodiment of the present invention.

FIG. 4 illustrates a method according to an embodiment of the present invention. When a new transaction request is received, the transaction data is examined to determine which budget nodes in the budget data structure are implicated by expenditure data identified by the transaction request and further to identify which control objects relate to the budget nodes (box 1010). For each control object, the system may retrieve prior expenditure data and budget values from the budget data structure based on the control object's budget address(es) (box 1020). Alternatively, the system may address the total values for the control objects directly from the ledger database. The system executes the rule (box 1030). If the rule generates an error, the method may notify the transaction system that the transaction is to be blocked (box 1040). If any rule generates an error, it is not necessary to execute all remaining rules (although it is permissible to do so); the transaction request will be blocked. If the rule generates a warning, the method may post a warning notification as specified in the rule (box 1050). Otherwise, the method may advance to execute the next rule (box 1060).

Following execution of the last identified rule, the method may determine whether the transaction was blocked (box 1070). If no rule generated an error, the system may inform the transaction system that the transaction request may be admitted (box 1080). The method may also update the AVC ledger database with the new expenditure data (box 1090).

A proper understanding of the foregoing embodiments may be facilitated through use of an example. Consider a scenario as shown in Table 1. As shown, a budget node for department A may store a budget value of € 10K. Budget nodes for sub-departments A1 and A2 each store budget values of € 20K. Budget nodes A1.1 and A1.2 store budget values of € 45K and budget nodes A2.1-A2.4 each store budget values of € 15K.

TABLE 1

| BUDGET NODE | BUDGET | AGGREGATED EXPENDITURE |
|---|---|---|
| A | €10 K | |
| A1 | €20 K | |
| A1.1 | €45 K | €45 K |
| A1.2 | €45 K | €45 K |
| A2 | €20 K | |
| A2.1 | €15 K | €25 K |
| A2.2 | €15 K | €25 K |
| A2.3 | €15 K | €25 K |
| A2.4 | €15 K | €25 K |

Aggregated expenditure for a certain point in time is shown in Table 1 as well. In this example, assume that expenditures are posted only to leaf nodes (e.g., A1.1, A1.2, A2.1, etc.) in the budget data structure but not to branch nodes (e.g., A1, A2). Other implementations may differ.

Returning to FIG. 3, rules 360, 370 and 380 are relevant to control objects A, A1 and A2. When rule 360 is executed, it sums all budget values and aggregated expenditure values of budget node A and of all nodes subordinate to it in control object A. Using the values presented in Table 1, € 200K is the budget total and € 190K is the expenditure total associated with rule 360. Execution of rule 370 sums all budget values and aggregated expenditure values of budget node A1 and the subordinate budget nodes A1.1 and A1.2 in control object A1 for a budget total of €110K and a € 90K expenditure total. Execution of rule 380 sums values of budget node A2 and its subordinate budget nodes in control object A2 for a budget total of 80 € and a expenditure total of € 100K.

Consider operation of the rules, however, when a new transaction request is presented which proposes an additional expenditure of € 10K against budget node A1.1. Execution of the rules would yield the following:

TABLE 2

| RULE | AGGREGATED EXPENDITURE | NEW EXPENDITURE | BUDGET | RULE VIOLATED? | RESPONSE |
|---|---|---|---|---|---|
| Rule 360 (control object A) | €190K | €10K | €200K | No | None |
| Rule 370 (control object A1) | €90K | €10K | €110K | No | None |
| Rule 380 (control object A2) | €100K | N/A | €80K | Rule not executed | N/A |

In this example, since budget node A1.1 does not contribute to control object A2, rule 380 need not be executed. Additionally, the proposed expenditure passes the requirements of rules 360 and 370 and, therefore, the expenditure can be admitted to system.

If a new transaction request, instead proposed an expenditure of € 20K to budget node A1.1, execution would yield:

TABLE 3

| RULE | AGGREGATED EXPENDITURE | NEW EXPENDITURE | BUDGET | RULE VIOLATED? | RESPONSE |
|---|---|---|---|---|---|
| Rule 360 (control object A) | €190K | €20K | €200K | Yes | Error |
| Rule 370 (control object A1) | €90K | €20K | €110K | No | None |
| Rule 380 (control object A2) | €100K | N/A | €80K | Rule not executed | N/A |

Again, rule 380 need not be executed because it does not use data from budget node A1.1 as a source. Execution of rule 360, however, generates an error. In this case, the total expenditure value including the proposed expenditure would be € 210K which exceeds the € 200K budget defined for control object A. Rule 370, if it were executed alone, would not generate an error.

If a transaction request has proposed an expenditure of € 10K to budget node A2.1, execution of the rule set would yield:

TABLE 4

| RULE | AGGREGATED EXPENDITURE | NEW EXPENDITURE | BUDGET | RULE VIOLATED? | RESPONSE |
|---|---|---|---|---|---|
| Rule 360 (control object A) | €190K | €10K | €200K | No | None |
| Rule 370 (control object A1) | €90K | N/A | €110K | Rule not executed | N/A |
| Rule 380 (control object A2) | €100K | €10K | €80K | Yes | Warning |

In this example, rule 360 is satisfied but rule 380 is not. In this example, the response, however is a warning. Thus, the proposed transaction can be admitted to the system.

The parallel AVC mechanism provided by the foregoing embodiments provides a convenient oversight mechanism through which EMAs can manage new transactions as they are admitted to the system and ensure that the transactions comply with multiple budgetary requirements of the organization. Although relatively simple data structures and rule sets are illustrated here, large corporations may define organizational data structures that include several thousands of budget nodes with complex rules for assigning control objects at different organizational levels. An EMA system may process several million transactions during the course of its fiscal year from a variety of sources. It is not always apparent that an expenditure directed to a low-level budget node (e.g., A1.1) may violate budgetary requirements defined for superior control objects at different higher organizational levels such as A1 and A. Because the AVC system of the present invention permits control objects to address arbitrary locations of the budget data structure, however, the AVC system ensures compliance no matter where an expenditure is posted nor at which level it must be checked.

The parallel AVC mechanism of the foregoing embodiments also provides a mechanism through which an organization can monitor the propriety of budget reductions. In some business applications, an organization may find it convenient to adjust budget allocations of a fiscal period at some point during the fiscal period. Rather than raise expenditure levels, the budget adjustments could cause budget levels to drop. Some budget levels may drop to an extent that it would cause violation of an AVC rule even though there has been no change in the aggregated budget. Thus, the parallel AVC mechanism can detect budgetary revisions that might be made in violation of a governing financial control strategy for the organization. To detect possible violations, it would be sufficient to perform the AVC checks of the foregoing embodiments after a budget revision occurs.

The foregoing describes operation of the present invention in the context of a transaction request that is simultaneously checked at two different organizational or aggregation levels. Of course, the principles of the present invention are not limited. In practice, a single transaction entered at a terminal T may generate a document to be processed by the EMA, for example, a purchase order or an invoice, that must simultaneously comply with budgetary requirements at more than two organizational or aggregation levels. In this case, the rule arrays accordingly would consist of more than two rule sets. From this document, the transaction system 110 (FIG. 1) may furthermore identify items therein that would cause different expenditure items that are relevant for AVC control. Multiple expenditure items simply may cause multiple instances of the foregoing methods and operations to be performed.

According to an embodiment, ledger databases 150, 160 (FIG. 1) may be provided for each of the rule sets defined in the rule array 140. This embodiment is useful because the ledger database not only may store total values of budget and expenditure data for the control objects identified in the rules of the rule array, which considerably improves the performance of online checks of the EMA system. But, for admitted transactions, they also may store underlying documentation and administrative data relating to the transaction or to the AVC checks of the executed rules. Such administrative data may identify, for example, an operator that generated the document or any warning messages issued during the AVC check. Each ledger database, in this embodiment, stores data that represents a filtered and aggregated view into the transaction database. As such, the ledger database may store a subset of the transactions present in the transaction database and may prove to be easier to review and use during an organization's operation.

The exemplary rule sets of FIG. 3 illustrate discrete sets of rules having been established for various layers within the budget data structure of FIG. 2. Although there is no requirement that the rule sets be differentiated along these lines, it can be advantageous to do so. Oftentimes in practice, common motivations exist for defining rules among business units (e.g., departments, sub-departments) in a common level of an organization's hierarchy. Because the various rule sets give rise to corresponding ledgers, by directing independent rule sets to independent layers in the budget data structure, it may generate a ledger that maintains a subset of the overall transaction data that is easier to peruse by system operators when reviewing the propriety of certain rules and when devising new policies for the organization.

As noted, the foregoing embodiments may provide a software implemented EMA system. As such, these embodiments may be represented by program instructions that are to be executed by a server or other common computing platform. One such platform 500 is illustrated in the simplified block diagram of FIG. 5. There, the platform 500 is shown as being populated by a processor 510, a memory system 520 and an input/output (I/O) unit 530. The processor 510 may be any of a plurality of conventional processing systems, including microprocessors, digital signal processors and field programmable logic arrays. In some applications, it may be advantageous to provide multiple processors (not shown) in the platform 500. The processor(s) 510 execute program instructions stored in the memory system. The memory system 520 may include any combination of conventional memory circuits, including electrical, magnetic or optical memory systems. As shown in FIG. 5, the memory system may include read only memories 522, random access memories 524 and bulk storage 524. The memory system not only stores the program instructions representing the various method described herein but also can store the data items on which these methods operate. The I/O unit 530 would permit communication with external devices, such as the communication network (FIG. 1) and other components.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. An availability control unit in a financial management computer system, comprising:
   a database to store a budget data structure having budget nodes, the budget nodes storing data representing available budget and expenditure items admitted to the financial management computer system;
   a database to store a rule data structure defining a plurality of rules, each rule having an associated response and an associated control object, where each control object includes at least one pointer to a budget node;
   a processor which, responsive to receiving a new expenditure transaction indicating an expenditure value to be added to a particular budget node, executing each rule associated with a control object that includes a pointer to the particular budget node;
   the processor configured to receive user input and modify one or more of the rules during runtime based on the user input;
   the processor configured to report an error and cause the new expenditure transaction to be blocked, responsive to any executed rule indicating an error.

2. The control unit of claim 1, where a plurality of the control objects each include a plurality of pointers, each pointing to a budget node.

3. The control unit of claim 1, further comprising:
   a ledger database provided for each rule data structure, the ledger database storing data representing an aggregation of values in all budget nodes of an associated control object.

4. The control unit of claim 1, wherein each rule is associated with an independent rule set of a plurality of rule sets that form the rule data structure.

5. The control unit of claim 4, wherein each rule of a particular rule set is associated with a control object that points to a budget node of a single layer of the budget data structure.

* * * * *